(12) United States Patent
Salama

(10) Patent No.: US 6,180,014 B1
(45) Date of Patent: Jan. 30, 2001

(54) DEVICE AND METHOD FOR TREATING WATER WITH OZONE GENERATED BY WATER ELECTROLYSIS

(76) Inventor: Amir Salama, 600 Robitaille, Granby, Québec (CA), J2G 9J6

( * ) Notice: Under 35 U.S.C. 154(b), the term of this patent shall be extended for 0 days.

(21) Appl. No.: 09/458,681

(22) Filed: Dec. 1, 1999

(51) Int. Cl.[7] ................................ C02F 1/32; C02F 1/46; C02F 1/78

(52) U.S. Cl. .................... 210/748; 210/723; 210/760; 210/787; 210/192; 210/205; 205/633; 205/636; 422/24; 422/186.07; 422/186.3

(58) Field of Search .................... 210/723, 748, 210/758, 760, 767, 787, 192, 198.1, 205; 205/633, 636; 422/24, 186, 186.07, 186.3

(56) References Cited

U.S. PATENT DOCUMENTS

| | | |
|---|---|---|
| 3,623,970 | 11/1971 | Haas . |
| 4,416,747 | 11/1983 | Menth et al. . |
| 4,504,445 * | 3/1985 | Walz ................ 422/186.07 |
| 4,728,441 | 3/1988 | King . |
| 5,114,549 | 5/1992 | Shimamune et al. . |
| 5,203,972 | 4/1993 | Shimamune et al. . |
| 5,205,994 | 4/1993 | Sawamoto . |
| 5,494,559 | 2/1996 | Patterson . |
| 5,589,052 | 12/1996 | Shimamune et al. . |
| 5,686,051 | 11/1997 | Shiota et al. . |
| 5,779,865 | 7/1998 | Schulze et al. . |

OTHER PUBLICATIONS

Brochure CH–M 9102, The Membrel® Mkll Electrolytic Ozone Generation System.

* cited by examiner

*Primary Examiner*—David A. Simmons
*Assistant Examiner*—Betsey Morrison Hoey
(74) *Attorney, Agent, or Firm*—Robic

(57) ABSTRACT

A process and a device for the treatment of water, especially for removing therefrom a large variety of pollutants, especially organic, inorganic and biological pollutants through in situ generation of ozone. Ozone is economically produced in situ at a high concentration through the interaction of electrolytically produced oxygen and UV light having a wavelength of 189 nm. The device has a set of anode and cathode for electrolytically producing nascent oxygen which reacts with UV light at a wavelength of 189 nm to produce ozone "in situ" within a vessel where the polluted water is submitted to the combinative action of ozone and other oxidation reactions. The device also has a hydrocyclone or retention tank of removing cationic pollutants such as heavy metals, free radicals as well as undesirable electrolysis byproducts such as nascent hydrogen through a secondary outlet. Oxidation by-products are subsequently removed from the exiting water stream by means of decantation, flocculation, coagulation or filtration.

17 Claims, 1 Drawing Sheet

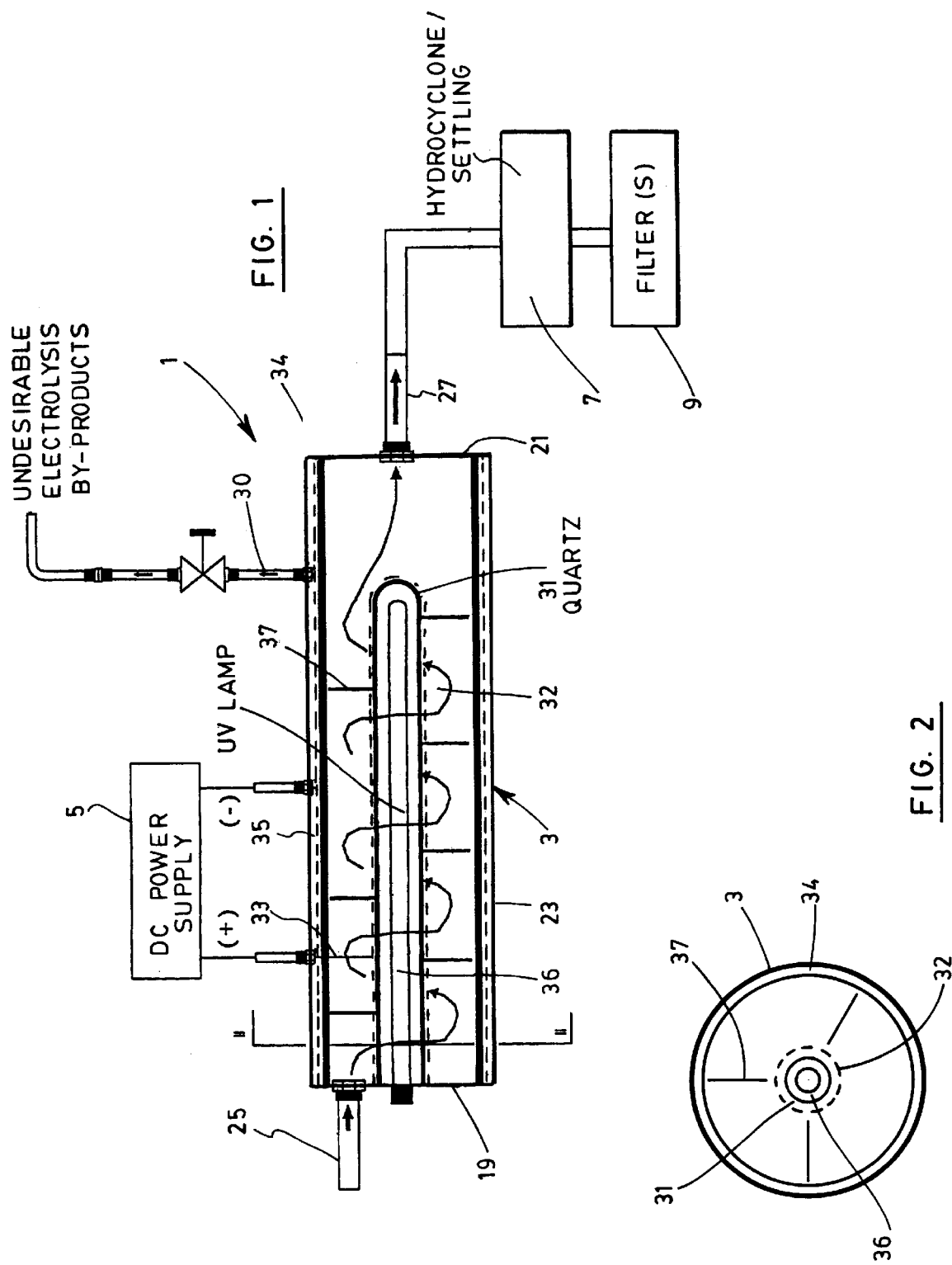

DEVICE AND METHOD FOR TREATING WATER WITH OZONE GENERATED BY WATER ELECTROLYSIS

FIELD OF THE INVENTION

The present invention relates to a method and a device for generating ozone in-situ in water in order to remove therefrom a large variety of pollutants, especially organic pollutants, in addition to bacteria and viruses.

DESCRIPTION OF THE PRIOR ART

In order to carry out purification of water without the use of biocides such as chlorine and other chemicals, it is well known in the art to use ozone ($O_3$) as a disinfectant. Ozone is usually prepared outside the medium (water) and then injected inside the water by means of injectors or bubbling in a contact column. Such makes the process bulky and costly as it involves the use of several devices.

It is also well known in the art that ozone can be produced by water electrolysis. By way of example, U.S. Pat. Nos. 5,250,177 and 5,154,895 disclose devices for generating ozone by electrolysis. The so generated ozone is then used for the purification of water. U.S. Pat. No. 4,728,441 discloses a device wherein ozone is produced from oxygen generated by electrolysis. However, the so generated ozone is recovered and used outside of the device. U.S. Pat. Nos. 4,416,747; 5,205,994; 5,686,051; 5,203,972 and 5,779,865 disclose devices using solid electrolyte to produce ozone. U.S. Pat. No. 3,623,970 discloses a device for producing a stream of ozone by electrolysis of water and conversion of the oxygen that is so produced into ozone.

It is further known in the art that ozone can be produced via UV light. By way of examples, reference can be made of U.S. Pat. Nos. 4,189,363 (Beitzel) and 4,992,169 (Izumiya).

It is further known that the efficiency of an apparatus using U.V. light to destroy microorganisms can be enhanced if ozone is mixed with the water to be purified. In this connection, reference can be made to U.S. Pat. No. 5,266,215 (Engelhard).

In U.S. Pat. No. 5,151,252 (Mass), there is disclosed a photochemical reactor for the treatment of a fluid polluted with photoreactants components. This patent discloses that the walls of the reactor in the treatment region may be coated with a catalyst in order to increase the rate of secondary reactions that occur with reaction products produced by the initial photochemical reaction.

To the inventor's personal knowledge, none of the prior art references known to him discloses a device or a process wherein a high level of dissolved ozone ($O_3$) and other active oxygen species are produced in situ to destroy pollutants and microorganisms in an economical way while allowing separation of the undesirable by-products of electrolysis.

SUMMARY OF THE INVENTION

The present invention is based on the discovery that ozone can be produced in situ inside a water stream by interaction between oxygen produced by electrolysis and a UV light having a wavelength of 189 nm. Such a production of ozone in situ eliminates the use of ozone generators and/or ozone injection peripherals. The so produced ozone is in a very soluble state. Moreover, the invention provides means for preventing hydrogen and other cations generated during the operation from reentering into the main stream.

It is therefore a first object of the invention to provide an efficient and economic method for the treatment of water, especially but not exclusively drinking water, by oxidation of its contaminants with ozone produced in situ. This method also permits to kill contaminating living pollutants such as bacteria and virus while separating undesirable electrolysis by-products.

The method according to the invention is intended to be used for purifying of pollutants containing water by oxidation of the pollutants to form oxidation products and removal of these oxidation products. In accordance with the invention, this method is characterized in that the pollutants containing water is treated within a vessel where ozone is produced in situ by UV irradiation on nascent oxygen produced by electrolysis.

It is another object of the invention to provide a device for carrying out the aforesaid method.

The device according to the invention is intended to be used for purifying pollutants containing water by oxidation of said pollutants to form oxidation products and removal of the so formed oxidation products. This device comprises:

a) at least one reactor, the reactor comprising:
   a vessel;
   at least one inlet means for introducing the pollutant-containing water to be purified in the vessel;
   at least one outlet means for the recovering of the purified water from the vessel;
   at least one duct extending centrally within the vessel, said duct being made of a material transparent to UV light;
   a UV lamp mounted within said least one duct, said UV lamp generating UV irradiation;
   an anode extending close to said at least one duct;
   a porous medium surrounding the anode;
   a cathode extending behind the porous medium;
b) a power supply operatively connected to said anode and cathode for generating between them a difference of potential; and
c) means for removing the oxidation products from the water,
whereby, in use, oxygen is produced by electrolysis at the anode and is converted in situ into ozone by the UV irradiation generated by the UV lamp the so generated ozone reaction with the pollutants contained in the water and converting them into oxidation products while, in the meantime, cationic ions of heavy metals, Ca++ and Mg++ are attracted by the cathode.

Preferably, the duct is made of quartz and the UV lamp is selected to produce electromagnetic waves at a wavelength of 189 nm.

Preferably also, the anode and cathode are formed of wire meshes made of an electrically conductive material, the wire mesh forming the anode surrounding the at least one duct, the wire mesh forming the cathode surrounding the porous medium.

BRIEF DESCRIPTION OF THE DRAWINGS

The present invention will be better understood upon reading the following non-restrictive description of a preferred embodiment thereof, made with reference to the accompanying drawings.

FIG. 1 is a longitudinal cross-sectional view of the reactor of a device according to the preferred embodiment of the invention.

FIG. 2 is a cross-sectional view taken along line II—II of the reactor shown in FIG. 1.

DESCRIPTION OF A PREFERRED EMBODIMENT OF THE INVENTION

The device according to the preferred embodiment of the invention shown in the accompanying drawings basically comprises a reactor 1 operatively connected to a DC power supply 5 and to means 7, 9 for removing the oxidation products formed within the reactor.

The reactor 1 comprises a vessel 3 which may be of any appropriate size (i.e. from a few inches to several feet). The vessel 3 may also be of any suitable configuration. However, as shown in FIG. 1, the vessel 3 is preferably in the form of an elongated tube comprising two opposite end portions 19 and 21 and an intermediate portion 23. The vessel 3 can be made of any suitable metallic or non-metallic material. At the end portion 19 of the vessel 3, inlet means are provided for introducing the pollutant-containing water to be purified into the vessel 3. As shown in FIG. 1, these inlet means may comprise a conduit 25 opening into the circular periphery of the end portion 19 of the vessel 3. At the opposite end portion 21, outlet means are provided for recovering the treated water from the vessel 3. As illustrated on FIG. 1, these outlet means may comprise a conduit 27 centrally positioned on the end portion 19.

The reactor 1 also comprises a central duct 31 made of a material transparent to UV light. This duct 31 extends coaxially within the vessel 3 and is surrounded by a wire mesh 32 made of a conductive material which can be of metal or graphite. Preferably, the conductive material of the wire mesh 32 is selected from the group consisting of platinized titanium, zirconium and columbium. The wire mesh 32 is connected to the DC power supply 5 by means of an electrical connector 33 made of platinum, gold, graphite or any other electrically conductive material that is not soluble in water. This connector 33 is connected to the positive pole of the DC power supply. As a result, the wire mesh 32 acts as an anode.

The reactor 1 further comprises a porous medium 34 surrounding the duct. This porous medium may consist of porous ceramic, sintered glass, sintered ceramic, sintered metal, perforated metal, cloth or non metal tubing, wire mesh or any other medium that is water permeable and porous. Another wire mesh 35 surrounds the porous medium 34. This wire mesh 35 can be made of the same conductive material as the wire mesh 32, viz. graphite or a metal. Preferably, this wire mesh 35 is made of a material selected amongst magnesium, aluminum, titanium, zirconium, palladium, platinum, columbium, vanadium, iron, magnesium, graphite, combinations thereof and alloys containing them. The wire mesh 35 is connected to the DC power supply by means of another electrical connector made of platinum, gold, graphite or any other electrically conductive material that is not soluble in water. As a result of such a connection, the wire mesh 35 acts as a cathode.

As shown in FIG. 2, the anode and cathode respectively defined by the wire meshes 32 and 35 extend concentrically and are separated by the porous medium 34. However, other arrangement could be devised if need be, provided that it allows production of oxygen close to the duct 31.

As aforesaid, the wire meshes 32 and 35 are connected to the power supply 5 for generating therebetween a difference of potential. The DC generated by the power supply may be either straight or pulsed D.C., superimposed A.C. on D.C. or temporarily reversed D.C. Of course, the current and voltage generated by the power supply must be sufficient to generate large amounts of oxygen around the duct 31.

An UV lamp generating UV irradiation at a wave length sufficient to allow conversion of oxygen into ozone (about 189 nm) is inserted centrally within the duct 31 which as aforesaid, is transparent to UV light. This duct is preferably made of quartz ($SiO_2$) but it could be made of any other material provided that such material (1) is capable of withstanding high hydraulic pressures and (2) it allows transmission of UV light having a wave length of about 189 nm. The purpose of the UV lamp 36 is to convert in situ into ozone the oxygen that is produced by electrolysis within the vessel. It is worth noting that the ozone produced by UV irradiation at 189 nm of the oxygen produced in situ by electrolysis at the anode 32, is not only generated in situ but also readily soluble. Of course, the ozone that is so generated reacts with the pollutants contained into the water and converts them into oxidation products.

As shown in FIG. 1, means 7, 9 are provided downstream the conduit 27 to remove the so formed oxidation products from the water. These means may comprise a hydrocyclone 7 and one or more filtration apparatuses. These means are well known in the art and need not be further described.

Alternatively, the oxidation products formed into the water may be removed from the same by retention in a separation tank. After a given period of time, the water separates into two phases, one consisting of purified water, the other one containing dissolved hydrogen and/or cationic pollutants. The purified water may then be recovered and further filtered if need be. If desired, a flocculating agent may be added to the water before or after it is introduced into the reactor to improve the efficiency of the removal of the oxidation products.

Turbulence means may advantageously be provided inside the vessel 3 for directing and temporarily retaining the flow of pollutant-containing water and thus for increasing the pathway of said water within the reactor and thereby the duration and efficiency of the treatment. As illustrated on FIG. 1, these turbulence means may consist of baffles 37 made of an inert material, which are connected to the internal surface of the vessel 3. Such baffles 37 preferably extend in a direction perpendicular to the general flow direction of water to be treated. As shown on FIGS. 1 and 2, the baffles 37 may consist in successive semi-circular plates.

In use, water to be purified is introduced through the inlet means 25 at the end portion 19 of the vessel 3, under a pressure sufficient to allow the water to flow trough the vessel 3. Preferably a pump (not shown) is used for providing a continuous flow of water through the vessel. The flow rate for the pump is chosen to achieve a registered time of residence into the vessel 3. This time of residence may easily be determined by those skilled in the art with regard to the rate of oxygen production within the vessel and the tension applied to provide a sufficient treatment of the polluted water. Within the vessel, the pollutant-containing water is treated with the ozone generated in situ by irradiation of the oxygen produced in situ by electrolysis. The treated water is then discharged by the outlet means 27. The oxidation products that are produced during the treatment are mainly non-toxic gas, like $CO_2$, and/or particles easily removable by filtration. If need be, another outlet 30 may also be provided at the periphery of the vessel to remove undesirable electrolysis by-products that may be produced during operation of the reactor.

Of course, numerous modifications could be made to the preferred embodiment disclosed hereinabove within departing from the scope of the invention as defined in the appended claims.

What is claimed is:

1. A device for purifying a pollutants containing water by oxidation of said pollutants to form oxidation products and removal of said oxidation products, said device comprising:

a) at least one reactor, said reactor comprising:

a vessel;

at least one inlet means for introducing the pollutants containing water to be purified in the vessel;

at least one outlet means for the recovering of the purified water from the vessel;

at least one duct centrally extending within the vessel, said duct being made of a material transparent to UV light;

a UV lamp mounted within said least one duct, said UV lamp generating UV irradiation;

an anode extending close to said at least one duct; and a porous medium surrounding the anode;

a cathode extending behind the porous medium;

b) a power supply operatively connected to said anode and cathode for generating between them a difference of potential; and c) means for removing the oxidation products form the water, whereby, in use, oxygen is produced by electrolysis at the anode and is converted in situ into ozone by the UV irradiation generated by the UV lamp, the so generated ozone reacting on the pollutants contained in the water and converting them into oxidation product while, in the meantime, cationic ions of heavy metals, Ca++ and Mg++ are attracted by the cathode.

2. A device according to claim 1, wherein said duct is made of quartz and said UV lamp is selected to product electromagnetic waves at a wave length of 189 nm.

3. A device according to claim 2, wherein said anode and cathode are formed of wire meshes made of an electrically conductive material, the wire mesh forming the anode surrounding the at least one duct, the wire mesh forming the cathode surrounding the porous medium.

4. A device according to claim 3, wherein the electrically conductive material of which said anode and cathode are made, is insoluble.

5. A device according to claim 4, wherein the electrically conductive materials of which said anode and cathode are made, is selected from the group consisting of magnesium, aluminum, titanium, zirconium, palladium, platinum, columbium, combinations thereof and alloys containing them.

6. A device according to claim 4, wherein wherein the electrically conductive material of which said anode and cathode are made, consists of graphite.

7. A device according to claim 1, wherein said vessel is provided with turbulence means for directing and temporarily retaining the water to be purified inside the reactor.

8. A device according to claim 1, wherein said reactor further comprises another outlet means for recovering the cationic ions attracted by the cathode from the vessel.

9. A device according to claim 1, wherein said means for removing the oxidation products from the water comprises a hydrocyclone.

10. A device according to claim 1, wherein said means for removing the oxidation products from the water comprises a retention tank.

11. A device according to claim 1 wherein said means for removing the oxidation products from the water comprises at least one filtration apparatus.

12. A method for purifying of a pollutants-containing water by oxidation of said pollutants to form oxidation products and removal of said oxidation products, wherein said pollutants-containing water is treated within a vessel where ozone is produced in situ by UV irradiation on nascent oxygen produced by electrolysis.

13. A method for purifying a pollutants-containing water by oxidation of said pollutants to form oxidation products and removal of the so formed oxidation products, said method comprising the following steps:

(i) providing a device according to claim 4, and (ii) processing said pollutants-containing water through said device.

14. The method according to claim 13, further comprising removing the oxidation products by retention of the processed water in a separate tank to form one phase of purified water which is recovered, and one other phase containing the oxidation products, which is discarded.

15. The method according to claim 14 wherein a flocculating agent is introduced into the water.

16. The method according to claim 13 further comprising removing the oxidation products by filtration.

17. The method according to claim 13, further comprising removing undesirable electrolysis by-products from the vessel through a separate outlet.

* * * * *